US012614149B1

(12) United States Patent
Kahric et al.

(10) Patent No.: US 12,614,149 B1
(45) Date of Patent: Apr. 28, 2026

(54) DYNAMIC WEIGHTED VOLUME THRESHOLDS FOR INVENTORY TOTES

(71) Applicant: Amazon Technologies, Inc., Seattle, WA (US)

(72) Inventors: Elvis Kahric, Rome (IT); Kevin Kreutzberger, Dusseldorf (DE); Ajith Abhindranath, Hannover (DE); Giulio Presazzi, Sondrio (IT); Tulio Vinicius Berbert Patriota, Novara (IT)

(73) Assignee: Amazon Technologies, Inc., Seattle, WA (US)

( * ) Notice: Subject to any disclaimer, the term of this patent is extended or adjusted under 35 U.S.C. 154(b) by 383 days.

(21) Appl. No.: 18/212,384

(22) Filed: Jun. 21, 2023

(51) Int. Cl.
　　*G06Q 10/087* 　　(2023.01)
　　*G01G 15/00* 　　(2006.01)

(52) U.S. Cl.
　　CPC ......... *G06Q 10/087* (2013.01); *G01G 15/006* (2013.01); *G01G 2015/008* (2013.01)

(58) Field of Classification Search
　　CPC .............. G06Q 10/087; G01G 15/006; G01G 2015/008
　　See application file for complete search history.

(56) References Cited

U.S. PATENT DOCUMENTS

| | | | | |
|---|---|---|---|---|
| 11,208,272 | B2 * | 12/2021 | Battles | ................. G06Q 10/08 |
| 11,429,991 | B1 * | 8/2022 | Tran | ................. G06Q 30/0202 |
| 11,969,760 | B1 * | 4/2024 | De La Rosa | ............. B07C 5/16 |
| 2023/0286019 | A1 * | 9/2023 | Ryan | ....................... B07C 3/082 |
| 2025/0229420 | A1 * | 7/2025 | Menon | ..................... B25J 9/162 |

FOREIGN PATENT DOCUMENTS

| | | | | | |
|---|---|---|---|---|---|
| CA | | 3145951 | A1 * | 2/2021 | ............. B07C 5/361 |
| WO | WO-2025085543 | A1 * | | 4/2025 | ............. G06Q 10/08 |

* cited by examiner

*Primary Examiner* — Florian M Zeender
*Assistant Examiner* — Kimberly S. Bursum
(74) *Attorney, Agent, or Firm* — Kilpatrick Townsend & Stockton LLP

(57) ABSTRACT

A method may include determining that a weighted volume of a first item in an inventory system. The weighted volume can be based on an actual volume and a weight associated with a volume category for the first item. The method may include comparing a weighted average volume based on weighted volumes for a second set of items in a container and a weighted volume of the first item with a volume threshold of the container. The method may include causing the item to be transferred to the container with respect to the comparison between the weighted average volume and the volume threshold. The method may include updating the volume threshold of the container based on a volume of a third set of items in the container after transferring the item to the container. The third set of items can include the first item and the second set of items.

20 Claims, 8 Drawing Sheets

VOLUME THRESHOLD 202

WEIGHTED AVERAGE VOLUME 204

RISK FACTOR 206

MACHINE LEARNING MODEL 208

INPUT 210

OUTPUT 212

PENALTY 214

CONTAINER FILLING % VOLUME PER CATEGORY

| | S1 | S2 | S3 | M1 | M2 | M3 | M4 | M5 |
|---|---|---|---|---|---|---|---|---|
| TOTE FILLING | 70% | 63% | 55% | 42% | 41% | 39% | 36% | 35% |

400

500

DETERMINE A WEIGHTED VOLUME OF A FIRST ITEM THAT IS TRANSPORTABLE BY A CONVEYER APPARATUS IN AN INVENTORY SYSTEM BASED ON AN ACTUAL VOLUME OF THE FIRST ITEM AND A WEIGHT ASSOCIATED WITH A VOLUME CATEGORY FOR THE FIRST ITEM 502

COMPARE A WEIGHTED AVERAGE VOLUME BASED ON WEIGHTED VOLUMES FOR A SECOND SET OF ITEMS IN A CONTAINER AND THE WEIGHTED VOLUME OF THE FIRST ITEM WITH A VOLUME THRESHOLD OF THE CONTAINER 504

CAUSE THE ITEM TO BE TRANSFERRED TO THE CONTAINER FROM THE CONVEYER APPARATUS WITH RESPECT TO THE COMPARISON BETWEEN THE WEIGHTED AVERAGE VOLUME AND THE VOLUME THRESHOLD 506

UPDATE THE VOLUME THRESHOLD OF THE CONTAINER BASED ON A VOLUME OF A THIRD SET OF ITEMS IN THE CONTAINER SUBSEQUENT TO CAUSING THE ITEM TO BE TRANSFERRED TO THE CONTAINER 508

FIG. 5

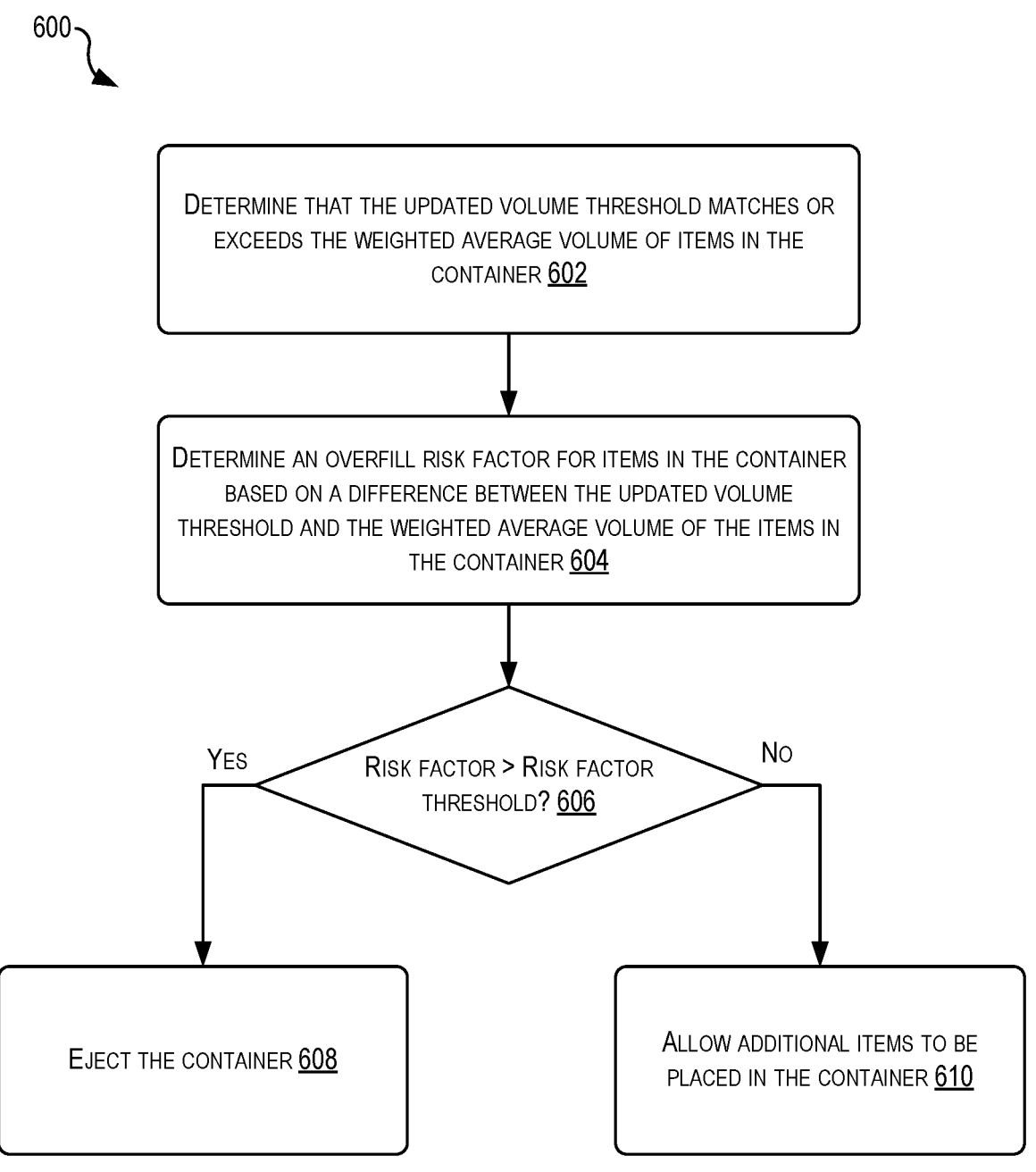

600

DETERMINE THAT THE UPDATED VOLUME THRESHOLD MATCHES OR EXCEEDS THE WEIGHTED AVERAGE VOLUME OF ITEMS IN THE CONTAINER 602

DETERMINE AN OVERFILL RISK FACTOR FOR ITEMS IN THE CONTAINER BASED ON A DIFFERENCE BETWEEN THE UPDATED VOLUME THRESHOLD AND THE WEIGHTED AVERAGE VOLUME OF THE ITEMS IN THE CONTAINER 604

YES

RISK FACTOR > RISK FACTOR THRESHOLD? 606

NO

EJECT THE CONTAINER 608

ALLOW ADDITIONAL ITEMS TO BE PLACED IN THE CONTAINER 610

FIG. 6

DYNAMIC WEIGHTED VOLUME THRESHOLDS FOR INVENTORY TOTES

BACKGROUND

Inventory storage systems are deployed in warehouses and other large buildings to stow inventory items. Some inventory storage systems store similar inventory items together, while others comingle inventory items of different sizes and types together into the same storage location (e.g., bin, shelf, tote, container, etc.).

BRIEF DESCRIPTION OF THE DRAWINGS

Various embodiments in accordance with the present disclosure will be described with reference to the drawings, in which:

FIG. 5 illustrates a flowchart showing an example process for determining placement of items in a container based on weighted volumes, according to some embodiments;

FIG. 6 illustrates a flowchart showing an example process for determining placement of items in a container based on weighted volumes and risk factor calculations, according to some embodiments;

DETAILED DESCRIPTION

Figure 1:
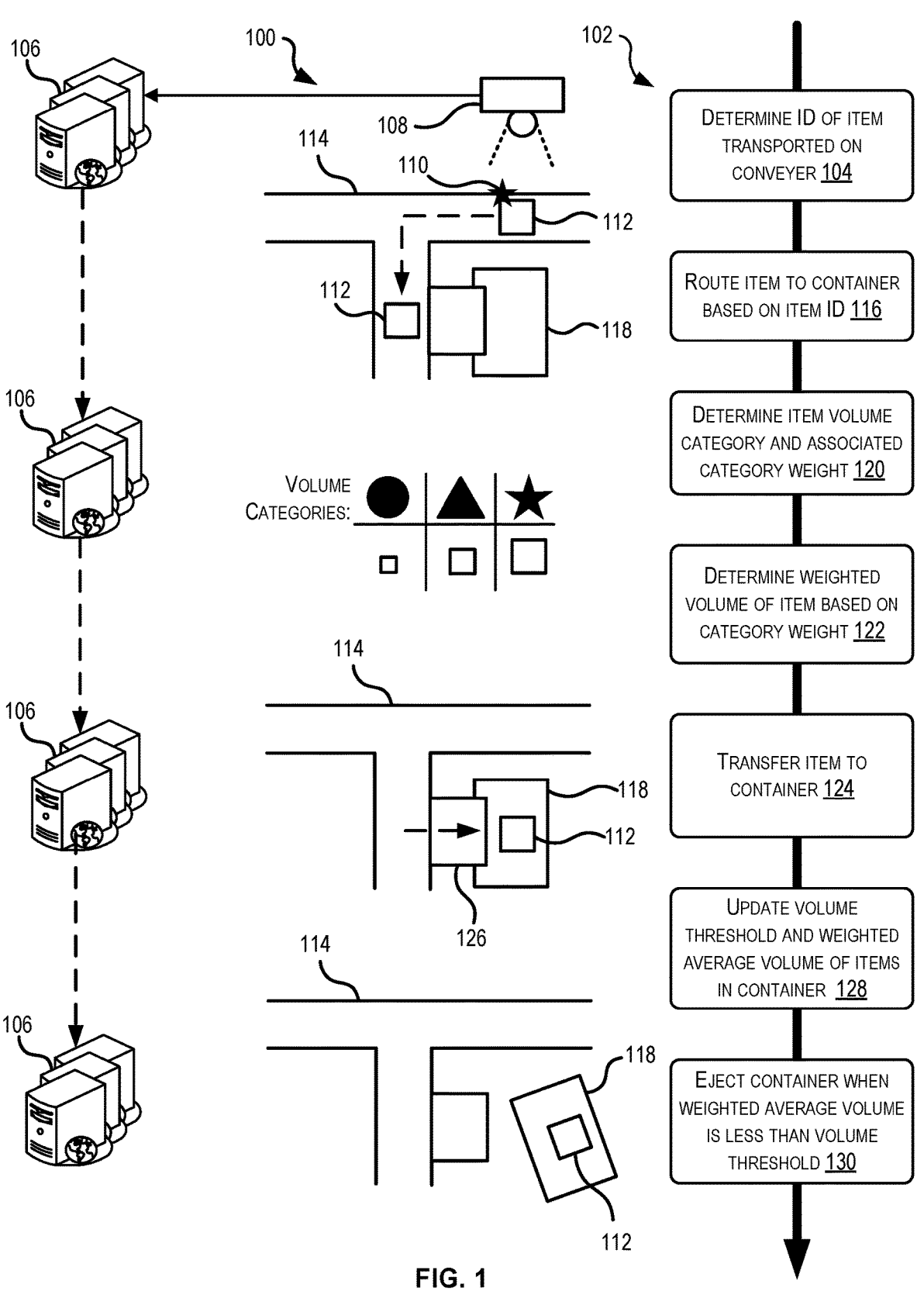
FIG. 1 illustrates a block diagram and a flowchart showing an example process for determining placement of items in an inventory container based on weighted volumes, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples of the present disclosure are directed to, among other things, methods, systems, devices, and computer-readable storage media relating to determining placement of items in inventory containers based on weighted volumes for incoming items and weighted average volumes of items already in the containers. Each container may have a volume threshold and a weighted average volume that can be updated each time an item is placed in the container. Weighted average volumes of the items in the container can be compared to the volume threshold to determine if the container should be closed. Thus, the volume of each item and its contribution to the container volume can be taken into consideration when determining item placement or closing of containers. This can reduce the risk of underfill for containers with relatively smaller items and the risk of overfill for container with relatively larger items. For example, containers filled with relatively larger or mis-shapen items can create voids in the container that are blocked from being filled. Static volume thresholds that are typically used in item placement may be intentionally set low to avoid overfilling, as containers that are overfilled may not be stacked and may require manual user intervention to remove or reorganize the items. But this can often result in container underutilization for containers filled with relatively smaller items. Techniques described herein relating to using volume thresholds and weighted average volumes to determine item placement can result in improved container utilization and reduced container underfilling and overfilling.

Turning now to a particular example, a computer-controlled inventory storage system in a warehouse can include a conveyer belt on which items can be transported to one of many containers. Generally, a computer system of the inventory storage system is configured to decide in real-time which container should receive the item based on characteristics of the item and characteristics of the items already in the container. Different sections of containers can be associated with different destination locations for items (e.g., different locations in the warehouse, different warehouses, etc.). An incoming item can be scanned (e.g., using an optical scanner or other suitable device) to determine which section of containers to which the item should be routed. As the item is conveyed to the section of containers, the computer system can determine if a container in the section can receive the item. This can be based on characteristics of the item as well as items already in the container. For example, a weighted volume of the item may be calculated by multiplying an actual volume of the item by a weight associated with a volume category for the item. The weight may be a percentage value that can serve as a conservative approximation of a volume in the container attributable to the item. Thus, the weight functions like a safety factor with respect to the actual volume.

The volume category may include a range of volumes that includes the actual volume of the item, and volume categories with relatively higher volume ranges can have relatively lower weights (e.g., lower percentages), while volume categories with relatively lower volume ranges can have relatively higher weights (e.g., higher percentages). The weighted volume of the item can be used with weighted volumes of items already in the container in a comparison with a volume threshold for the container. The volume threshold may not be a static threshold. Instead, the volume threshold may be a ratio of actual volumes in the container with a total volume capacity of the container. The item may be added to the container if adding the item causes an average weighted volume of container items to meet or exceed the volume threshold. If adding the item would cause the volume threshold to exceed the average weighted volume, the item may not be added. Items can continue to be added until the volume threshold of the container meets its average weighted volume.

Examples of the present disclosure provide various technological advantages over a conventional computer system for determining item placement in inventory containers. For instance, conventional approaches rely on comparing an actual volume of items in the container to a static volume threshold for the container. Often, static volume thresholds are typically set at a much lower volume than an actual volume of the container to avoid overfilled containers. But a container that is primarily filled with relatively smaller items will therefore be underfilled, increasing inefficiency in the inventory system. The weighted volumes and volume threshold described herein can provide a more accurate representation of container filling. This can prevent or reduce the need for user intervention to address underfilling or overfilling of containers and can increase efficiency of item stowing in the inventory system.

Turning now to the figures, FIG. 1 illustrates a block diagram 100 and a flowchart showing an example process 102 for determining placement of items 112 in an inventory container 118 based on weighted volumes, according to some embodiments. The diagram 100 includes a computer system 106, material handling equipment 114 such as a conveyer apparatus, and other elements within an inventory storage system. Examples of the inventory storage system are described in U.S. patent application Ser. No. 16/455,069 filed Jun. 27, 2019 and titled "Automated item sortation and container handling systems," the contents of which are expressly incorporated herein by reference in its entirety. The computer system 106 can be any suitable combination of computing devices such as one or more server computers, which may include virtual resources, services, and the like capable of performing the functions described with respect to the computer system 106. In some examples, components of the computer system 106 may be distributed between a server (e.g., a cloud-based virtual instance) and a local computer. Generally, the computer system 106 is configured to control item placement in inventory containers in the inventory storage system.

The diagram 100 also includes a scanner device 108, which may be any suitable optical or non-optical scanner, capable of scanning identifying information associated with inventory items 112. A user may use the scanner device 108 to scan the inventory items 112. In some examples, the scanner device 108 may operate under the control of the computer system 106. In some examples, the computer system 106 may be located at a station, such as a stow station, in order to perform the techniques described herein. The inventory items 112 may be transported by material handling equipment 114 to different inventory containers 118 (e.g., totes, bins, packages, boxes, etc.).

FIGS. 1 and 5-7 illustrate example flow diagrams showing processes 100, 500, 600, and 700, according to at least a few examples. These processes (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 102 begins at 104 by the computer system 106 determining an inventory identification number 110 of an item 112 handled by material handling equipment 114 (e.g., transported on a conveyer apparatus). For example, the computer system 106 can receive scan information of the inventory item 112 from the scanner device 108. In some examples, the scanner device 108 may have collected the scan information as a user places the inventory item 112 within a scanning field of the scanner device 108. Or, the scanner device 108 may have collected the scan information as the inventory item 112 enters the scanning field while being transported on the material handling equipment 114. The scan information may include the identification number 110 (e.g., a stock keeping unit, a barcode, a global trade item number, etc.) that is unique to the item type of the inventory item 112. The computer system 106 may determine inventory information associated with the inventory item 112 using the identification number 110. This may include accessing a database of item information maintained by the computer system 106 or by a different system. In some examples, this may include an application programming interface (API) or similar function call to an internal service that maintains such information.

In some examples, the inventory item information can include dimensions of the item, weight, description, storage rules, expected time to be stored, a destination location in the inventory storage system, and any other suitable property. The dimensions of the item can be used to determine a volume of the inventory item 112. For example, the dimensions can include a length, a width, and a height of the inventory item 112 that can be multiplied together to generate the volume. In some examples, the inventory item information may include the volume of the inventory item 112.

At block 116, the computer system 106 routes the inventory item 112 to a location of the inventory storage system associated with the destination location. For example, the computer system 106 can control the material handling equipment 114 to route the inventory item 112 to a lane that includes container 118. The lane may include additional containers that are also associate with the destination location.

At block 120, the computer system 106 determines a volume category for the inventory item 112 based on the volume of the inventory item 112. Each volume category can be associated with a range of volumes. Additionally, each volume category can have an associated volume weight. In some examples, the volume weight can be associated with a percentage of a container volume that is fillable with items from that volume category. Thus, categories for larger volumes can be associated with lower weights, as larger items can create more empty space inside a container 118.

At block 122, the computer system 106 can determine a weighted volume of the inventory item 112 based on the category weight. For example, the weighted volume may be determined by multiplying the actual volume of the inventory item 112 by its associated category weight (e.g., a percentage). The weighted volume can indicate an impact that the inventory item 112 will have on a fill level of the container 118. In some examples, the weighted volume may also be determined based on other characteristics of the inventory item 112. For example, the weighted volume may be adjusted based on a surface area, a shape, or any other characteristics of the inventory item 112 that may affect the amount of empty space created by placing the inventory item 112 in a container 118.

At block 124, the computer system 106 can transfer the inventory item 112 to the container 118 based on a volume threshold of the container 118 and a weighted average volume of items in the container 118. In one example, the volume threshold of the container 118 can be determined by dividing a sum of the actual volume of inventory items in the container 118 with a total volume capacity of the container 118. Each time an inventory item is added to the container 118, the volume threshold can be updated. The weighted average volume can be determined by dividing the weighted volume of all items in the container 118 with the actual volume of items in the container 118. So, if a weighted average volume of (i) the inventory item 112 and (ii) the inventory items already in the container 118 is greater than the volume threshold, the computer system 106 can transfer the inventory item 112 to the container 118. For example, the computer system 106 can control the material handling equipment 114 and a transfer apparatus 126 to transfer the inventory item 112 to the container 118. If the volume threshold exceeds the weighted average volume, the inventory item 112 is not added to the container 118.

At block 128, the computer system 106 can update the volume threshold of the container to include the new inventory item 112. Additionally, the computer system 106 can update the weighted average volume of the container 118 to include the new inventory item 112. The volume threshold and the weighted average volume can be re-calculated each time an inventory item is added to the container 118. At block 130, the container 118 can be ejected from the inventory storage system if the weighted average volume is less than the volume threshold. For example, the computer system 106 may cause the container 118 to be ejected from the inventory storage system. Or, the computer system 106 may output an indication that the container 118 has reached a fill condition, and a user may close and remove the container 118 from the inventory storage system.

Figure 2:
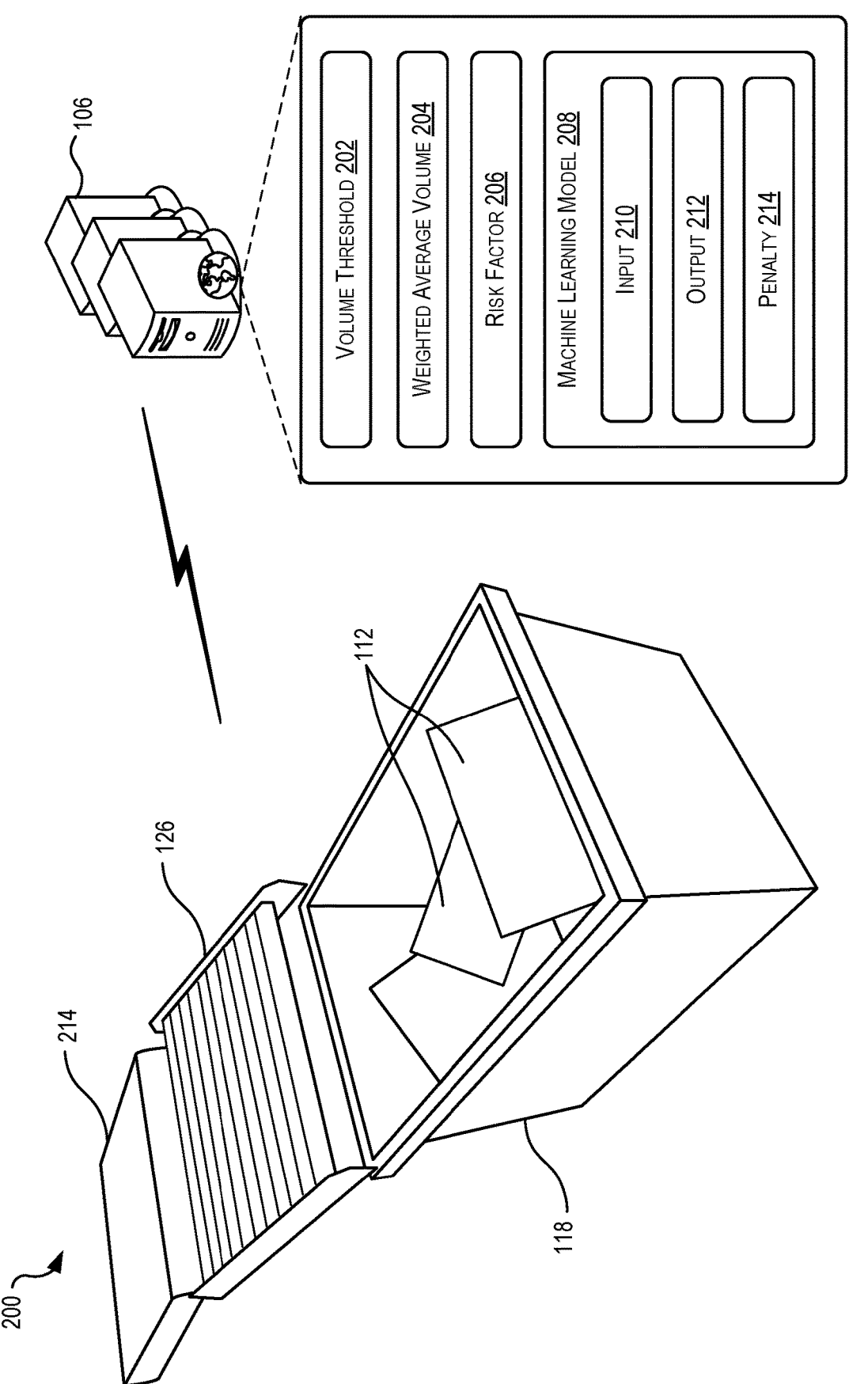
FIG. 2 illustrates an example inventory stow station at which techniques relating to determining placement of items in a container based on weighted volumes may be implemented, according to some embodiments.

FIG. 2 illustrates an example inventory stow station 200 at which techniques relating to determining placement of items 112 in a container 118 based on weighted volumes may be implemented, according to some embodiments. The inventory stow station 200 can include a conveyer apparatus 214 that can transport inventory items 112 to a container 118. The inventory stow station 200 can also include a transfer apparatus 126 that can transfer the inventory items 112 from the conveyer apparatus 214 to the container 118. The inventory stow station 200 can include or be controlled by the computer system 106, which can determine item placement based on a volume threshold 202 of the container 118.

In some examples, the computer system 106 may determine item placement or closing of the container 118 based on an additional risk factor 206. This can make item placement determination more flexible to certain conditions. For example, an inventory item 112 may have a length that is significantly longer than a width. Such an inventory item 112 may fall into the container 118 in various orientations. The different orientations may create different sizes of empty space inside the container 118. The risk factor 206 can be calculated to accommodate the different orientation possibilities. For example, incorporating the risk factor 206 into item placement determination can lower the risk of overfilling the container 118 by causing the container 118 to be ejected with lower item volume.

In one example, the risk factor 206 can be determined by subtracting the volume threshold 202 from the weighted average volume 204 of inventory items 112 in the container 118. The container 118 may be ejected if the weighted average volume 204 is less than the volume threshold 202 and the risk factor 206 exceeds a risk factor threshold. For example, the risk factor threshold may range from 0.1 to 0.3, with lower threshold values being set to increase container utilization and higher threshold values being set to lower container utilization. Additionally or alternatively, the risk factor 206 can be associated with a surface area or a shape of the inventory item 112, or any other characteristic of the inventory item 112. In some examples, the weighted volume of an individual inventory item 112 can be determined based on a risk factor 206 for the inventory item 112.

In some examples, the computer system 106 may determine whether to transfer an inventory item 112 to the container 118 based on trained machine learning model 208. The machine learning model 208 can be trained by providing historical data of item characteristics, such as actual volumes of inventory items and associated weighted volumes of the inventory items that have been transferred to a container, as input 210 to the machine learning model 208. In some examples, the historical data may additionally include item characteristics such as aspect ratios, surface areas, compactness levels, or volume-to-surface area ratios for the inventory items. The machine learning model 208 can generate an output 212 that indicates whether the container has been overfilled. The computer system 106 can compare a reference condition to the output 212. For example, the computer system 106 can compare the output 212 to an overfill condition (e.g., a container with the inventory items would be overfilled). If the machine learning model 208 incorrectly indicated that the container had not been overfilled, the computer system 106 can modify the machine learning model 208 by assigning a penalty 214 based on the overfill condition to further train the machine learning model 208.

The computer system 106 can then use the trained machine learning model 208 to determine if a particular inventory item 112 can be added to the container 118. For example, the computer system 106 can input the weighted volume of the inventory item 112, the actual volume of the inventory item 112, and the weighted volumes of items already in the container 118 into the trained machine learning model 208. Other item characteristics can additionally be inputted, such as aspect ratios, surface areas, compactness levels, or volume-to-surface area ratios for the inventory items. The trained machine learning model 208 can generate an output 212 based on the input 210 that indicates whether transferring the inventory item 112 to the container 118 will cause the container 118 to be overfilled. The computer system 106 can use the output 212 to determine whether to transfer the inventory item 112.

Figure 3:
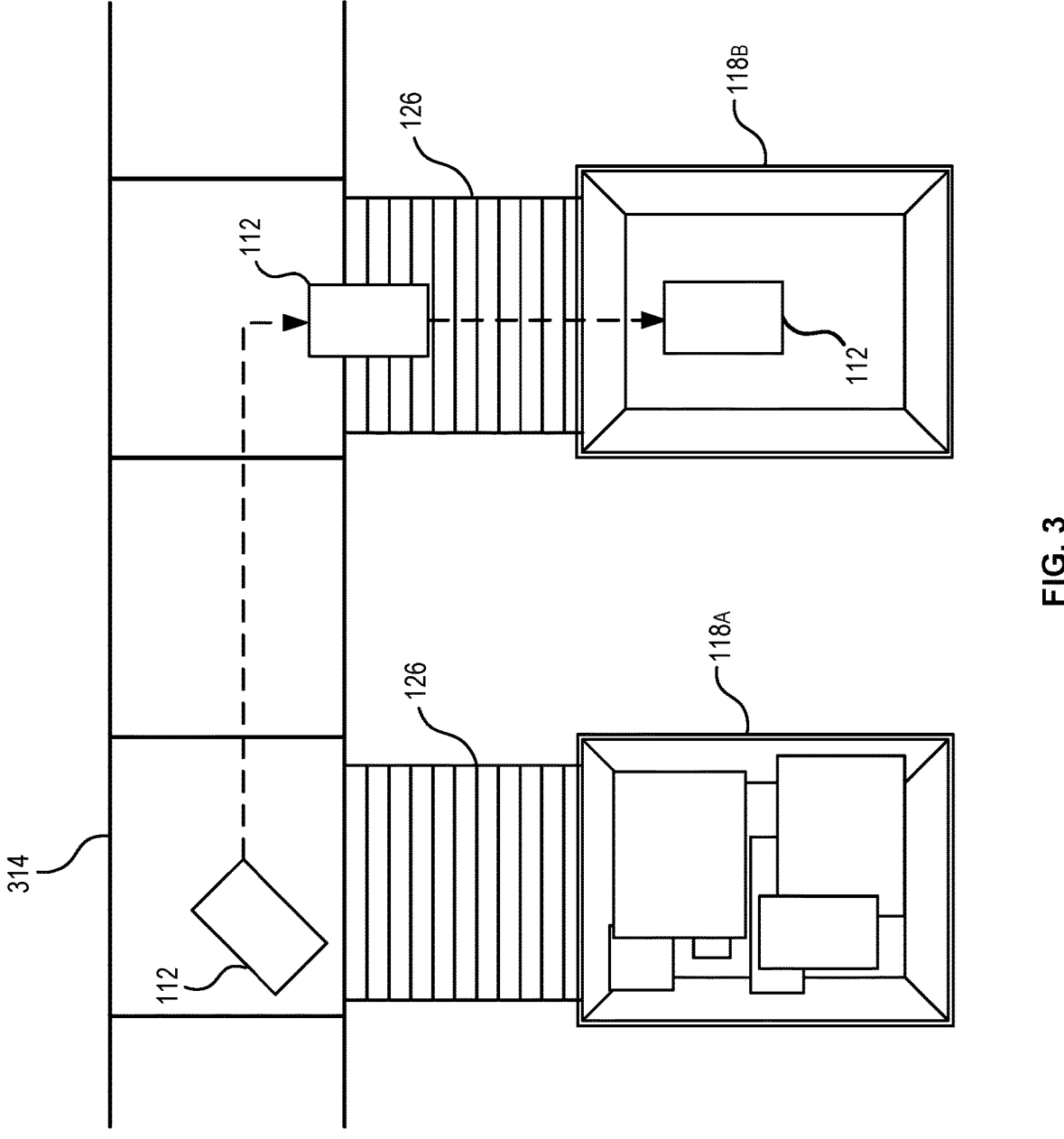
FIG. 3 illustrates an overhead view of another example inventory stow station at which techniques relating to determining placement of items in containers based on weighted volumes may be implemented, according to some embodiments.

FIG. 3 illustrates an overhead view of another example inventory stow station 300 at which techniques relating to determining placement of items in containers based on weighted volumes may be implemented, according to some embodiments. The inventory stow station 300 can include a conveyer apparatus 314 that can transfer inventory items 112 into a first container 118a and a second container 118b via transfer apparatuses 126. Both containers 118a-b may be associated with the same destination location of an inventory item 112, so the inventory item 112 may be routed into either container 118a-b.

In the example depicted in FIG. 3, the inventory item 112 may initially be routed towards the first container 118a, which may already be filled with several inventory items. But the computer system 106 (of FIGS. 1-2) may determine that adding the inventory item 112 to the first container 118a would cause its volume threshold to match or exceed a weighted average volume of the inventory item 112 and items already in the container 118 (e.g., adding the inventory item 112 would overfill the container 118). Therefore, the computer system 106 can cause the conveyer apparatus 314 to divert the inventory item 112 away from the first container 118a. The computer system 106 can then determine the inventory item 112 can be added to the second container 118b, such as by comparing a volume threshold for the second container 118b with another weighted average volume of items in the second container 118*b* and the inventory item 112. If the volume threshold for the second container 118*b* is less than this weighted average volume, the computer system 106 can cause the inventory item 112 to be routed to the second container 118*b*.

Diverting inventory items 112 may affect when containers 118 are ejected, as it may not be efficient or beneficial for a container 118 that is almost full but keeps having inventory items 112 diverted away for long periods of time. In one example, a container 118 that has not received inventory items 112 within a threshold amount of time may be ejected, regardless of the current weighted average volume and volume threshold. In some examples, an exponential function can be used for time thresholds. For example, the threshold amount of time since receiving an inventory item 112 that dictates ejection of the container 118 can exponentially decrease as the total amount of time that the container 118 has been receiving inventory items increases. In another example, a container 118 that has had more than a threshold number of items diverted away may be ejected.

Diverting inventory items away from certain containers may also affect routing of future inventory items. For example, if items keep getting diverted away from a container 118 (e.g., more than a threshold number of items are diverted, or items have not been transferred within a threshold amount of time), this may indicate that small items may be needed to eject the container 118. Thus, when the computer system 106 identifies an inventory item 112 that is in a particular volume category that includes relatively smaller volume ranges, the computer system 106 may route the inventory item 112 to that container 118. Or in other words, the computer system 106 may determine that inventory items that are in volume categories with relatively larger volume ranges are to be diverted away from the container 118.

In some examples, the inventory stow station 300 may have a maximum number of containers 118*a-b* that can be opened for a particular destination location. In the example depicted in FIG. 3, only two containers 118 can be open to receiving items 112 at a time. This may result in a scenario in which both containers 118*a-b* are able to receive additional items but adding an incoming inventory item 112 would overfill either of the containers 118*a-b* (e.g., cause its volume threshold to match or exceed a weighted average volume of the inventory item 112 and items already in either of the containers 118*a-b*). The inventory stow station 300 may be unable to open another container 118 for the inventory item 112. Thus, although neither of the containers 118*a-b* have reached an eject condition and could potentially receive more items without becoming overfilled, one of the containers 118*a-b* may be closed. For example, the first container 118*a* may have a higher ratio between its volume threshold and weighted average volume than the second container 118*b* (e.g., the first container 118*a* may be more full than the second container 118*b*). The first container 118*a* may therefore be ejected and a new container can be opened. The inventory item 112 can be placed in the newly opened container.

Figure 4:
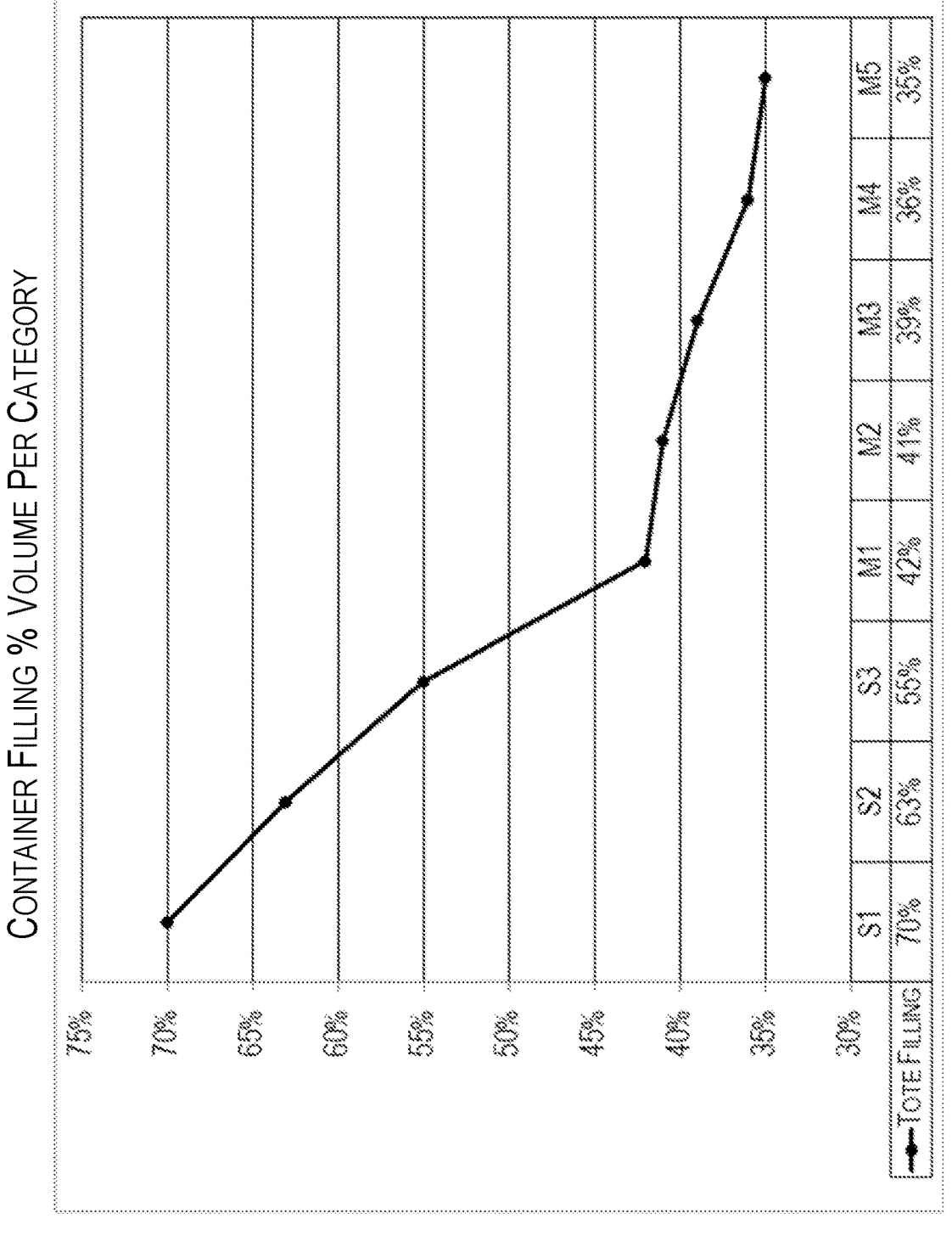
FIG. 4 illustrates an example graph of volume fill percentages for volume categories of items, according to some embodiments.

FIG. 4 illustrates an example graph 400 of volume fill percentages for volume categories of items, according to some embodiments. Volume categories S1, S2, S3, M1, M2, M3, M4, and M5 are each associated with volume ranges of inventory items. Although FIG. 4 depicts eight volume categories, any number and range of volume categories can be used. In an example, S1 includes the smallest volume ranges (e.g., from 0 cm$^3$ to 620 cm$^3$) and M5 includes the largest volume ranges (e.g., from 17901 cm$^3$ to 31,500 cm$^3$).

S2 may range from 621 cm$^3$ to 2350 cm$^3$, S3 may range from 2351 cm$^3$ to 3000 cm$^3$, M1 may range from 3001 cm$^3$ to 4100 cm$^3$, M2 may range from 4101 cm$^3$ to 7000 cm$^3$, M3 may range from 7001 cm$^3$ to 12900 cm$^3$, and M4 may range from 12901 cm$^3$ to 17900 cm$^3$.

The graph 400 depicts example percentages of a total volume capacity for a container that is filled with inventory items associated with a particular category. For example, a container filled to a total volume capacity with inventory items from the S1 volume category to a total volume capacity would fill 70% of the container, as such inventory items are relatively smaller.

In comparison, a container filled with inventory items from the M5 volume category would fill only 35% of the container, as the relatively larger M5 items would create more empty space in the container than the smaller S1 items. The filling percentages can be used as the weights (e.g., a weighted percentage) that can be used to determine weighted volume of items. For example, the computer system 106 may identify that an inventory item with a volume of 500 cm$^3$ falls within the volume range for the S1 volume category. Thus, the weighted volume of the inventory item can be determined by multiplying 500 cm$^3$ by 0.7, resulting in a weighted volume of 350 cm$^3$.

FIG. 5 illustrates a flowchart showing an example process 500 for determining placement of items in a container based on weighted volumes, according to some embodiments. The computer system 106 of FIGS. 1-2 or the environment 800 of FIG. 8 may perform the aspects of the process 500.

The process 500 begins at block 502 by determining a weighted volume of a first item that is transportable by a conveyer apparatus in an inventory system. The weighted volume is determined based on an actual volume of the first item and a weight associated with a volume category for the first item. In some examples, the weighted volume can be determined based on a surface area or a shape of the first item. The weight associated with the volume category can be a percentage of a total volume capacity of the container that is fillable with items associated with the volume category.

At block 504, the process 500 includes comparing a weighted average volume that is based on weighted volumes for a second set of items in a container and a weighted volume of the first item with a volume threshold of the container. In some examples, the weighted average volume can be based on (i) a sum of the weighted volume of the first item and the weighted volumes of the second set of items in the container and (ii) the actual volume of the first item and an actual volume of the second set of items in the container. At block 506, the process 500 includes causing the item to be transferred to the container with respect to the comparison between the weighted average volume and the volume threshold.

At block 508, the process 500 includes updating the volume threshold of the container based on a volume of a third set of items in the container subsequent to causing the item to be transferred to the container. The volume threshold can be updated based on the volume of the third set of items in the container and a total volume capacity of the container. If the volume threshold of the container exceeds the weighted average volume, the container can be ejected from the inventory system. In some examples, additional items can also be prevented from being added to the container. If the volume threshold of the container does not exceed the weighted average volume, transfer of additional items to the container can be enabled.

In some examples, the process 500 can include determining that items have not been transferred to the container within a threshold amount of time. In response, the container can be ejected from the inventory system. In other examples, the process 500 can include determining that more than a threshold number of items have been diverted away from the container. In response, the container can be ejected from the inventory system. Or, additional items can be prevented from being added to the container. The process 500 can include determining that (i) more than a threshold number of items have been diverted away from the container or (ii) items have not been transferred to the container within a threshold amount of time. In response, items associated with a particular volume category can be routed to the container.

In some examples, the process 500 can include generating a trained machine learning model by providing actual volumes of items and weighted volumes of items transferred to a container as input into a machine learning model. Then, an output can be received from the machine learning model based on the input indicating that the container has not been overfilled. A comparison can be performed between the output and a reference condition for the container, the reference condition comprising an overfill condition for the container. The machine learning model can be modified based on the comparison by assigning a penalty based on the overfill condition.

The trained machine learning model can then be used to determine if an item can be added to a container. For example, the process 500 can include inputting the weighted volume of the first item, the actual volume of the first item, and the weighted volumes for the second set of items in the container into the trained machine learning model. Then, an output can be received from the trained machine learning model based on the input that indicates that transferring the first item to the container will not cause the container to be overfilled. The item can then be transferred to the container based on the output.

In some examples, after an item has been placed based on a recommendation from the trained machine learning model, an annotation for the recommendation can be received. The annotation can indicate results of the item placement, such as whether the item placement resulted in a container underfill or overfill. The trained machine learning model can be retrained using training data that includes item data, container data, and the annotation. The retrained machine learning model can then be used to make further predictions for item placement.

FIG. 6 illustrates a flowchart showing an example process 600 for determining placement of items in a container based on a dynamic volume threshold and risk factor calculations, according to some embodiments. The computer system 106 of FIGS. 1-2 or the environment 800 of FIG. 8 may perform the aspects of the process 600.

The process 600 begins at block 602 by determining that the updated volume threshold (e.g., updated after placing an item in the container) matches or exceeds the weighted average volume of items in the container. In examples where a risk factor is not included in item placement determination, the container may therefore be ejected. In the example of FIG. 6, additional conditions may be met before the container is ejected.

At block 604, the process 600 involves determining an overfill risk factor for items in the container based on a difference between the updated volume threshold and the weighted average volume of the items in the container. For example, the overfill risk factor may be calculated by subtracting the updated volume threshold from the weighted average volume. At block 606, the process 600 can include determining if the overfill risk factor exceeds a risk factor threshold. If the overfill risk factor exceeds the risk factor threshold, the process 600 can continue to block 608. If the overfill risk factor does not exceed a risk factor threshold, the process 600 can continue to block 610.

At block 608, the process 600 can include ejecting the container from the inventory system. The container can therefore be ejected only if both conditions are met (e.g., updated volume threshold exceeds the weighted average volume and overall risk factor exceeds the risk factor threshold). At block 610, the process 600 includes allowing additional items to be placed in the container, even though the updated volume threshold may exceed the weighted average volume.

Figure 7:
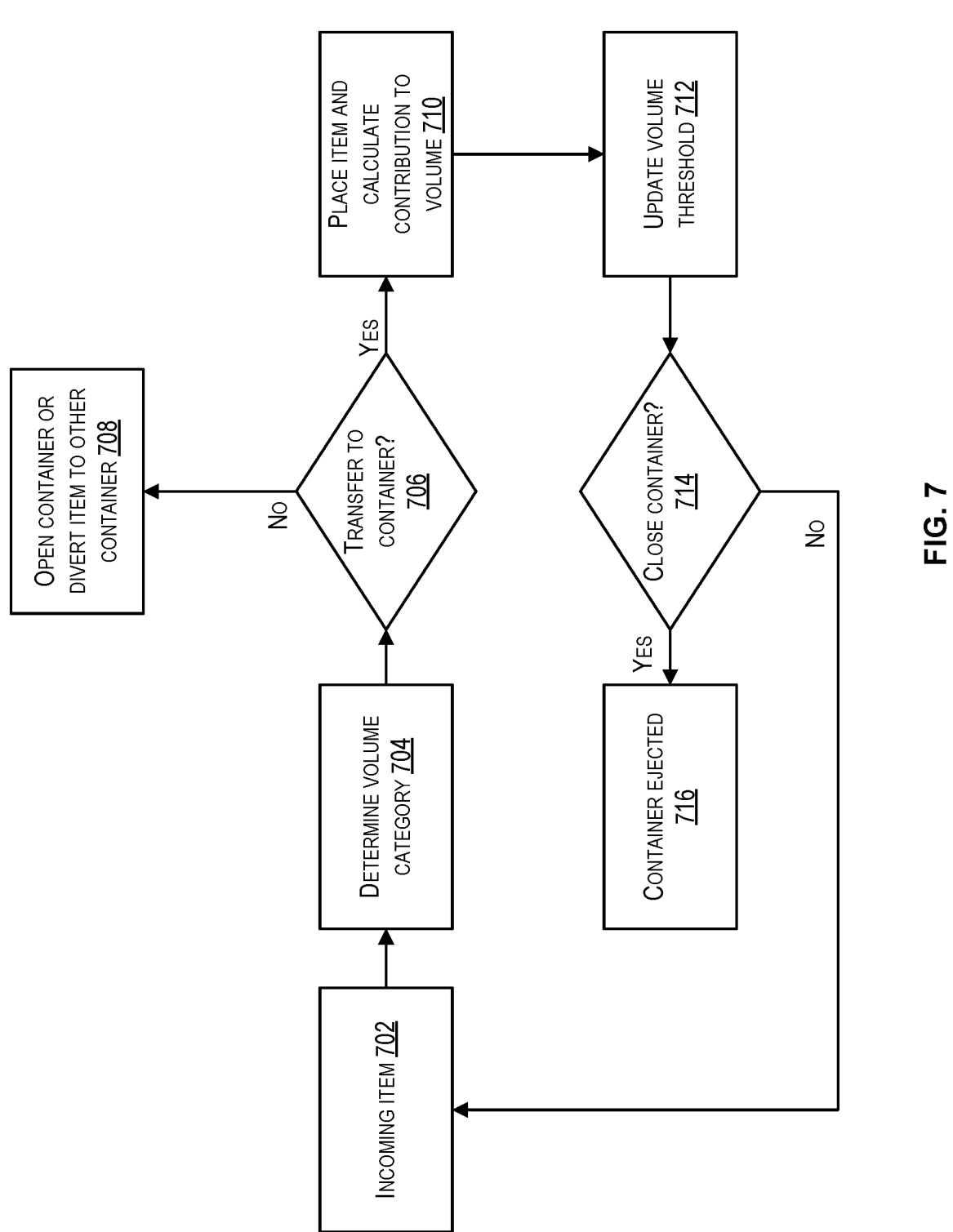
FIG. 7 illustrates a flowchart showing another example process for determining placement of items in a container based on weighted volumes, according to some embodiments.

FIG. 7 illustrates a flowchart showing another example process 700 for determining placement of items in a container based on weighted volumes, according to some embodiments. The computer system 106 of FIGS. 1-2 or the environment 800 of FIG. 8 may perform the aspects of the process 700.

The process 700 begins at block 702, with detecting an incoming item being conveyed in an inventory system. An identification number for the item can be detected, such as by scanning the item. An inventory database can be accessed using the identification number to identify inventory information for the item. For example, the inventory information can include a volume of the item or dimensions of the item that can be used to determine the volume. At block 704, the process 700 includes determining a volume category for the item. Volume categories can each define a range of item volumes that are each associated with a weight (e.g., a percentage contribution to filling a container).

At block 706, the process 700 includes determining if the item can be transferred to a container. If a container for the item is not yet opened, or if the item cannot be transferred to the container, the process 700 continues to block 708. If the item can be transferred to the container, the process 700 continues to block 710. The item can be transferred to the container based on a comparison between a weighted average volume of items in the container (including the item) and a volume threshold for the container. The weighted average volume can be determined by dividing the weighted volumes of the items by their actual volumes. The volume threshold can be determined by dividing an actual volume of items in the container by a total volume capacity of the container. If the weighted average volume is above the volume threshold, the item can be added to the container.

At block 708, the process 700 includes diverting the item to another container to determine if the item can be placed in the other container. Or, if another container is not available, a new container can be opened and the item can be placed in the new container. At block 710, the process 700 includes placing the item in the container and its contribution to the weighted average volume can be calculated. For example, the weighted average volume for the container can be updated to include the weighted volume of the item. At block 712, the process 700 includes updating the volume threshold for the container. For example, the volume threshold can be updated to include the actual volume of the item.

At block 714, the process 700 includes determining if the container should be closed. If the container should be closed, the process 700 continues to block 716. If the container should not be closed, the process 700 continues to block 702, where additional incoming items can be considered for placement in the container. The container can be closed if the updated volume threshold meets or exceeds the weighted average volume of the container. This can indicate that the container has met its fill condition. At block 716, the process 700 includes ejecting the container due to the container meeting its fill condition.

Figure 8:
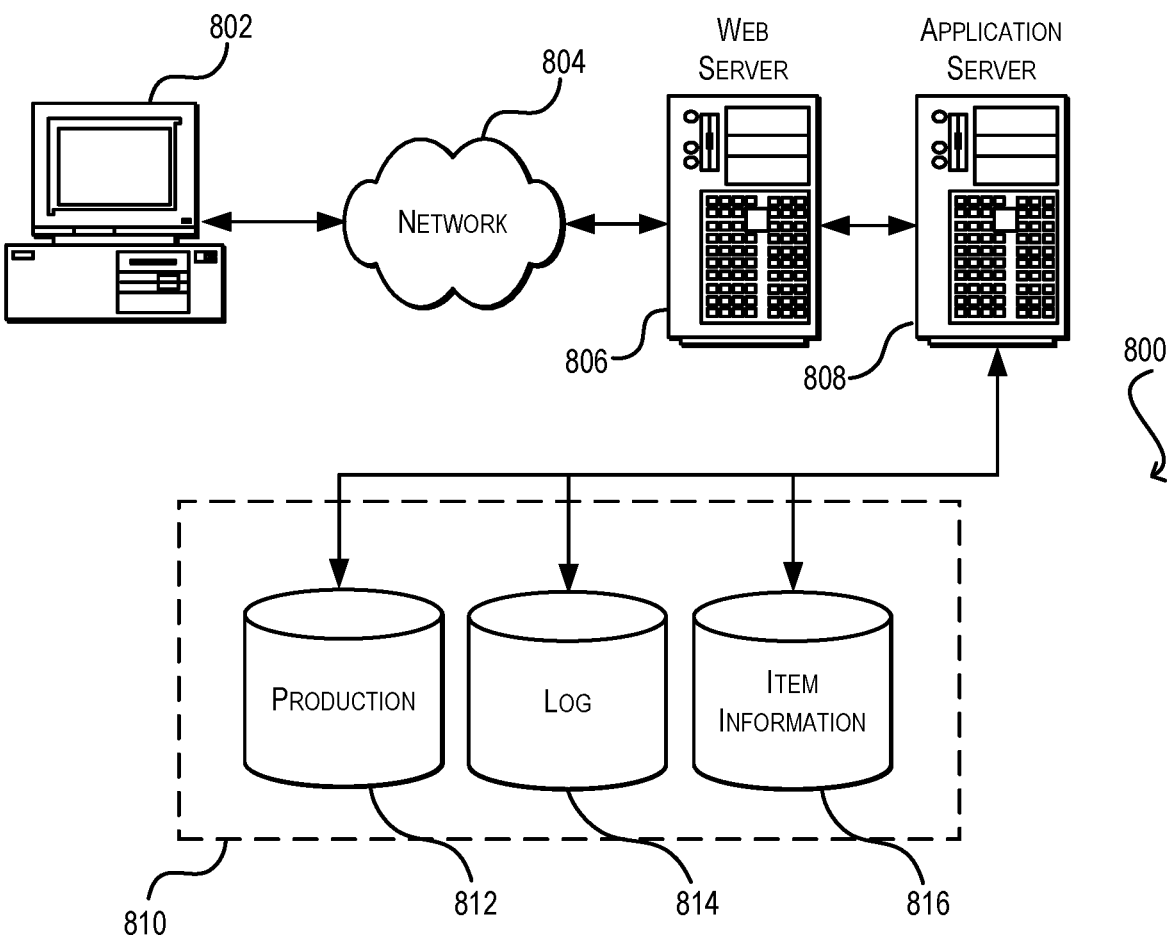
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and item information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory system, comprising: a conveyer apparatus configured to convey items to be placed in containers; a transfer apparatus configured to receive the items from the conveyer apparatus and transfer the items to the containers; and a computer system operably coupled with the conveyer apparatus and the transfer apparatus, the computer system configured to: identify an identification number associated with an item that is transportable on the conveyer apparatus of the inventory system; identify dimensions of the item and a destination location for the item associated with the identification number; route the item to a location of the inventory system associated with the destination location via the conveyer apparatus; determine a volume category of a plurality of volume categories for the item based on the dimensions of the item, each volume category of the plurality of volume categories associated with a range of volumes and a category weight; determine a weighted volume for the item based on the category weight associated with the volume category and an actual volume of the item determined from the dimensions of the item; compare a volume threshold of a container at the location with a weighted average volume based on a current weighted volume of items in the container and the weighted volume for the item; cause the transfer apparatus to transfer the item to the container from the conveyer apparatus in response to determining that the volume threshold of the container does not match or exceed the weighted average volume of the current weighted volume of items in the container and the weighted volume for the item; subsequent to transferring the item to the container: determine an update to the volume threshold for the container based on a sum of the actual volume of items in the container and a total volume capacity of the container; compare the weighted average volume of the items in the container to the updated volume threshold, the weighted average volume determined based on a sum of weighted volumes of items in the container and the sum of the actual volume of items in the container; and eject the container from the inventory system in response to determining that the updated volume threshold matches or exceeds the weighted average volume of the items in the container.

2. The inventory system of claim 1, wherein the container is a first container at the location, the volume threshold is a first volume threshold, and the weighted average volume is a first weighted average volume, and wherein the computer system is further configured to: divert the item away from the first container at the location in response to determining that the volume threshold of the first container matches or exceeds the weighted average volume of the current weighted volume of items in the container and the weighted volume for the item; determine that a second volume threshold for a second container does not match or exceed a second weighted average volume of a current weighted volume of items in the second container at the location and the weighted volume for the item; and route the item to the second container in response to determining that the second volume threshold of the second container does not match or exceeds the second weighted average volume of the current weighted volume of item s in the second container and the weighted volume for the item.

3. The inventory system of claim 1, wherein the computer system is further configured to: determine an overfill risk factor for items in the container based on a difference between the updated volume threshold and the weighted average volume of the items in the container; and eject the container from the inventory system in response to determining that (i) the updated volume threshold matches or exceeds the weighted average volume of the items in the container and (ii) the overfill risk factor matches or exceeds a risk factor threshold for the container.

4. The inventory system of claim 1, wherein the computer system is further configured to: determine an overfill risk factor for the item based on dimensions of the item; and determine the weighted volume for the item based on the overfill risk factor for the item.

5. A method, comprising: determining by a computer system, a weighted volume of a first item handled by material handling equipment in an inventory system based on an actual volume of the first item and a weight associated with a volume category for the first item, the first item being transported by a conveyer apparatus of the material handling equipment; comparing by the computer system, a weighted average volume based on weighted volumes for a second set of items in a container and the weighted volume of the first item with a volume threshold of the container; causing, by the computer system, a transfer apparatus to transfer the item to the container from conveyer apparatus based on the comparison between the weighted average volume and the volume threshold; and updating, by the computer system, the volume threshold of the container based on a volume of a third set of items in the container subsequent to causing the item to be transferred to the container, the third set of items comprising the first item and the second set of items.

6. The method of claim 5, wherein the weighted average volume is based on (i) a sum of the weighted volume of the first item and the weighted volumes for the second set of items in the container and (ii) the actual volume of the first item and an actual volume of the second set of items in the container.

7. The method of claim 5, wherein updating the volume threshold is based on the volume of the third set of items in the container and a total volume capacity of the container.

8. The method of claim 5, further comprising:
determining that the volume threshold of the container exceeds the weighted average volume; and ejecting the container from the inventory system in response to determining that the volume threshold of the container exceeds the weighted average volume.

9. The method of claim 5, further comprising:
determining that items have not been transferred to the container within a threshold amount of time; and ejecting the container from the inventory system in response to determining that items have not been transferred to the container within the threshold amount of time.

10. The method of claim 5, further comprising:

determining that more than a threshold number of items have been diverted away from the container; and ejecting the container from the inventory system in response to determining that more than the threshold number of items have been diverted away from the container.

11. The method of claim 5, wherein determining the weighted volume of the item is based on a surface area or a shape of the first item.

12. The method of claim 5, further comprising:

determining that (i) more than a threshold number of items have been diverted away from the container or (ii) items have not been transferred to the container within a threshold amount of time; and routing items associated with a particular volume category to the container in response to determining that (i) more than the threshold number of items have been diverted away from the container or (ii) items have not been transferred to the container within the threshold amount of time.

13. The method of claim 5, wherein the weight associated with the volume category comprises a percentage of a total volume capacity of the container that is fillable with items associated with the volume category.

14. The method of claim 5, further comprising:

determining a risk factor associated with overfilling the container based on a difference between the updated volume threshold and the weighted average volume; and transferring the first item to the container based on determining that the risk factor does not exceed a risk factor threshold for the container.

15. The method of claim 5, further comprising:

generating a trained machine learning model by: providing item characteristics of items transferred to a container as input into a machine learning model, the item characteristics comprising actual volumes, weighted volumes, aspect ratios, surface areas, compactness levels, or volume-to-surface-area ratios of the items; receiving an output from the machine learning model based on the input indicating that the container has not been overfilled; performing a comparison between the output and a reference condition for the container, the reference condition comprising an overfill condition for the container; and modifying the machine learning model based on the comparison by assigning a penalty based on the overfill condition.

16. The method of claim 15, further comprising: inputting item characteristics of the first item and the second set of items in the container into the trained machine learning model; receiving another output from the trained machine learning model based on the input indicating that transferring the first item to the container will not cause the container to be overfilled; and transferring the item to the container based on the other output.

17. One or more non-transitory computer-readable media comprising computer-executable instructions that, when executed by one or more processors of a computer system, cause the computer system to perform operations comprising:

determining a weighted volume of a first item based on an actual volume of the first item and a weighted percentage associated with a volume category for the first item, the first item being transported on a conveyer apparatus; comparing a weighted average volume for weighted volumes of the first item and a second set of items in a container with a volume threshold of the container; causing a transfer apparatus to transfer the first item from the conveyer apparatus to the container based on the comparison between the weighted average volume and the volume threshold; and subsequent to the first item being transferred to the container, updating the volume threshold based at least in part on a volume of a third set of items in the container and a total volume capacity of the container, the third set of items comprising the first item and the second set of items.

18. The one or more non-transitory computer-readable media of further comprising computer-executable instructions that cause the computer system to perform operations comprising, subsequent to the first item being transferred to the container: comparing the weighted average volume of the third set of items in the container to the volume threshold; determining that the volume threshold does not exceed the weighted average volume of the third set of items in the container; and enabling transfer of additional items to the container in response to determining that the volume threshold does not exceed the weighted average volume of the third set of items in the container.

19. The one or more non-transitory computer-readable media of further comprising computer-executable instructions that cause the computer system to perform operations comprising: determining that the volume threshold exceeds the weighted average volume of the third set of items in the container; and preventing additional items from being added to the container in response to determining that the volume threshold exceeds the weighted average volume of the third set of items in the container.

20. The one or more non-transitory computer-readable media of further comprising computer-executable instructions that cause the computer system to perform operations comprising: determining that (i) more than a threshold number of items have been diverted away from the container or (ii) items have not been transferred to the container within a threshold amount of time; and preventing additional items from being added to the container in response to determining that (i) more than the threshold number of items have been diverted away from the container or (ii) items have not been transferred to the container within the threshold amount of time.

* * * * *